United States Patent [19]
Houlihan et al.

[11] 3,868,390
[45] Feb. 25, 1975

[54] SPIRO DIBENZOCYCLOHEPTENE ISOINDOLINE

[75] Inventors: William J. Houlihan, Mountain Lakes; Jeffrey Nadelson, Lake Parsippany, both of N.J.

[73] Assignee: Sandoz-Wander, Inc., Hanover, N.J.

[22] Filed: Jan. 19, 1973

[21] Appl. No.: 325,076

Related U.S. Application Data

[63] Continuation-in-part of Ser. No. 188,860, Oct. 13, 1971, abandoned, which is a continuation-in-part of Ser. No. 122,092, March 8, 1971, abandoned, which is a continuation-in-part of Ser. No. 54,597, July 13, 1970, abandoned.

[52] U.S. Cl. ... 260/326.1, 260/325 PH, 260/559 D, 260/570.8 TC, 424/274

[51] Int. Cl. ............................................ C07d 27/48
[58] Field of Search ................................. 260/326.1

[56] References Cited
UNITED STATES PATENTS
3,741,980    6/1973    Houlihan et al. ................ 260/326.1

*Primary Examiner*—Joseph A. Narcavage
*Attorney, Agent, or Firm*—Gerald D. Sharkin; Robert S. Honor

[57] ABSTRACT

Spiro[10,11-dihydro-5H-dibenzo[a,d]cycloheptene-5,1'-N-methyl isoindoline] may be prepared by treating a corresponding isoindolinone with mild reducing agent. The compound is useful as an analgesic.

2 Claims, No Drawings

SPIRO DIBENZOCYCLOHEPTENE ISOINDOLINE

This application is a continuation-in-part of application Ser. No. 188,860 filed Oct. 13, 1971 which in turn is a continuation-in-part of Ser. No. 122,092, filed Mar. 8, 1971, which in turn is a continuation-in-part of application Ser. No. 54,597, filed July 13, 1970, all now abandoned.

This invention relates to a spiro dibenzocycloheptene isoindoline, acid addition salts and intermediates thereof, and processes for the preparation of these materials.

The free base of this invention may be represented by the following structural formula:

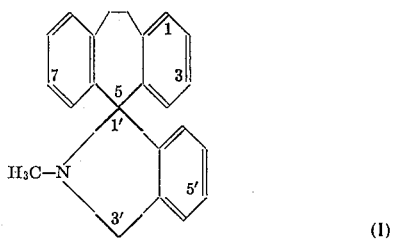

(I)

The compound of formula (I) may be prepared as represented by the following reaction scheme:

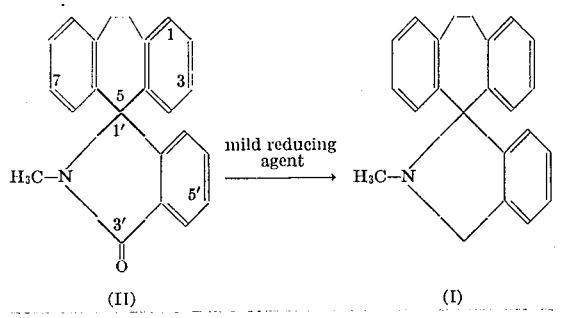

According to this aspect of the invention, the compound of formula (I) is prepared by reducing a compound of formula (II) with a mild reducing agent, particularly metal hydride, e.g. lithium aluminum hydride, diisobutylaluminum hydride, diborane, or sodium bis-(2-methoxyethoxy)aluminum hydride, in inert solvent and inert atmosphere, e.g. nitrogen gas, at a temperature of from about 50° to 150°C., conveniently at the reflux temperature of the system, for about 15–48 hours, preferably about 18 to 24 hours. Solvents which may be used include ethers such as ethyl ether or tetrahydrofuran, or hydrocarbon solvents such as benzene, toluene and the like. The temperature, reaction times and solvents used are not critical. The compound of formula (I) may be recovered using conventional recovery techniques such as crystallization.

The compound of formula (I) may also be prepared according to the following reaction scheme:

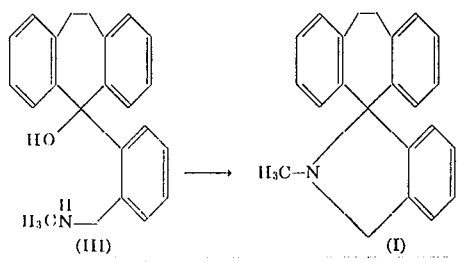

The compound of formula (I) may accordingly be prepared by treating a compound of formula (III) in an aqueous or non-aqueous media with mineral acid, such as sulfuric acid, a hydrohalic acid such as hydrochloric or hydrobromic acid, phosphoric acid and the like, at a temperature of from about 70° to 120°C., conveniently at the reflux temperature of the system. Moe preferably, the compound (I) may be prepared from a compound of formula (III) by treatment with organic acids or their anhydrides, such as acetic acid, trifluoroacetic acid, acetic acid anhydride, trifluoroacetic acid anhydride and the like, at a temperature of about −10° to +10°C., preferably −5° to +5°C.

The reaction is suitably conducted for about 1–48 hours, preferably 18–24 hours for the mineral acids, and 1–5 hours for the organic acids or their anhydrides. The presence of solvent is not necessary but solvents which may be used if desired include ethers such as tetrahydrofuran or hydrocarbons such as hexane, heptane, benzene and the like. To improve yields and obtain a better quality product, the reaction may be performed under inert atmosphere, e.g. nitrogen gas. Neither the time nor temperature of reaction is critical. The compound (I) may be recovered using conventional recovery techniques, such as filtration.

The compound of formula (III), a further aspect of this invention, may be prepared according to the following reduction reaction:

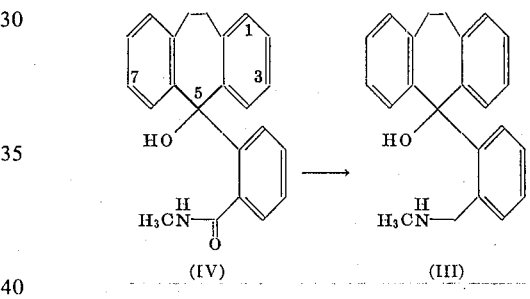

Compound (III) is obtained from compound (IV) utilizing the same reaction conditions as indicated previously in connection with the reduction of compound (II) to obtain compound (I).

The compound of formula (II), a still further aspect of this invention, may be prepared as indicated below:

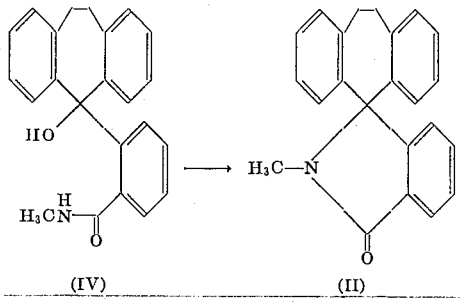

Compound (IV) is cyclized to provide compound (II) by use of the same reaction conditions previously indicated respecting the process for preparing compound (I) from compound (III).

According to yet another aspect of this invention, the new and novel compound (IV) may also be prepared as illustrated in the following reaction scheme from compounds (V) and (VI):

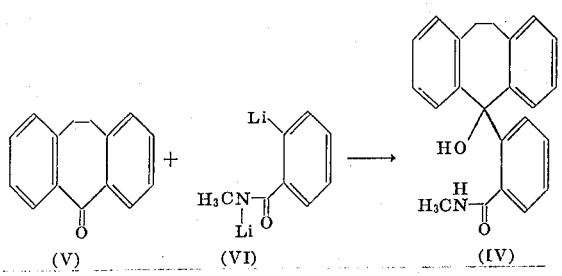

Compounds (IV) may accordingly be prepared by condensing a compound (V) with a compound (VI) in an inert solvent such as ethers, e.g. diethyl ether or tetrahydrofuran, or hydrocarbons or aromatic hydrocarbons such as hexane, heptane, benzene, toluene and the like, and subjecting the reaction mixture to hydrolysis, preferably with aqueous ammonium chloride. This condensation may be carried out at a temperature of from about −10° to +10°C., preferably −5° to +5°C. for about 1 to 3 hours. The exact time and temperature of reaction and the particular solvent used is not critical in obtaining the product (IV). Said product may then be recovered by conventional techniques, e.g. filtration.

The compounds of formulae (V) and (VI) are known and may be prepared by methods described in the literature.

The compound of formula (I) is useful because it possesses pharmacological activity in animals, such as mammals. In particular, the compound possesses analgesic activity as indicated by its activity in mice and rats given 25–100 mg/kg of compound orally when tested using the "Hot-Plate" method of Woolfe and McDonald (J. Pharmacol. & Exper. Therap. 80:300, 1944), the writhing test, using benzoquinone, of Seigmund et al. (Proc. Soc. Exp. Biol., 95:729, 1957) as modified by Okun et al. (J. Pharmacol. & Exper. Therap., 139:107, 1963) and the Randall-Selitto Method, (Arch. Int. Pharmacodyn., 111:409, 1957) as modified by Winter and Flataker (J.P.E.T. 148:373, 1965).

When so utilized, the compound may be combined with one or more pharmaceutically acceptable carriers or adjuvants. It may be administered orally or parenterally, and, depending upon the mode of administration, the exact dosage utilized may vary.

Furthermore, the compound of formula (I) may be similarly administered in the form of its non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

In general, satisfactory results are obtained when the active agent is administered orally at a daily dosage of from about 0.1–100 mg/kg, especially 1–25 mg/kg of animal body weight preferably given in divided doses, 2 to 4 times a day or in sustained release form. For most larger mammals (e.g., primates) the total daily dosage is from about 5 milligrams to about 300 milligrams, preferably 60–300 mg., and the parenteral dosage is, e.g. from about 1–50 mg. intramuscularly pro re nata. Oral dosage forms suitable for internal use comprise from about 1.5 milligrams to about 150 milligrams, preferably 15–150 milligrams of the active compound in intimate admixture with a solid or liquid pharmaceutically acceptable carrier or diluent.

EXAMPLE 1

2-[10,11-Dihydro-5-hydroxy-5H-dibenzo[a,d]cyclohepten-5-yl]-N-methyl benzamide

To a flask equipped with a stirrer, dropping funnel, condenser and gas inlet tube, maintained under a nitrogen atmosphere there is added at room temperature 15.2 g (0.108 mole) of N-methyl benzamide and 150 ml of dry tetrahydrofuran. The reaction flask is immersed in an ice bath and cooled to an internal temperature of about 5°C. Stirring is initiated and 152 ml. of 1.6 M. n-butyl lithium (0.240 mole) in hexane is added dropwise in ca. one hour maintaining the temperature below about 8°C. The resulting red dilithio salt is stirred at about 5° C. for an additional hour and then a solution of 22.5 g. (0.108 mole) 10,11-dihydro-5H-dibenzo[a,d]cyclohepten-5-one in 75 of anhydrous tetrahydrofuran is added dropwise in ca. 45 minutes maintaining the temperature at between −10°C. and 10°C. The resulting mixture is stirred at about 5°C. for one hour and then treated with 100 ml. of saturated aqueous ammonium chloride maintaining the temperature below 10°C. the layers are separated and the tetrahydrofuran layer is dried over anhydrous magnesium sulfate, filtered, and evaporated in vacuo. The resulting oil is tritured with cold ether and filtered to give 2-[10,11-dihydro-5-dibenzo[a,d]cyclohepten-5-yl]-N-methyl benzamide; m.p. 188°–191°C (gas evolution).

EXAMPLE 2

Spiro[10,11-dihydro-5H-dibenzo[a,d]cycloheptene-5,1′-N-methyl isoindolin-3′one]

To a flask equipped with a stirrer, condenser and gas inlet tube maintained under a nitrogen atmosphere there is added at room temperature 10 g. (0.0292 mole) of 2-[10,11-dihydro-5-hydroxy-5H-dibenzo[a,d]cyclohepten-5-yl]-N-methyl benzamide and 150 ml. of 2 M. sulfuric acid. Stirring is initiated and the mixture is heated at reflux for 18 hours. The reaction mixture is cooled and extracted with 2 × 150 ml. of methylene chloride. The methylene chloride is washed with 100 ml. of water, dried over anhydrous magnesium sulfate and evaporated in vacuo. The resulting oil is triturated with cold ether and filtered to give spiro[10,11-dihydro-5H-dibenzo[a,d]cycloheptene-5,1′-N-methyl isoindolin-3′-one]; m.p. 188° – 190°C. Recrystallization from hot ethyl acetate provides the product with a m.p. of 194°–195°C.

EXAMPLE 3

Spiro[10,11-dihydro-5H-dibenzo[a,d]cycloheptene-5,1′-N-methyl isoindoline]

To a flask equipped with a stirrer, condenser and gas inlet tube maintained under a nitrogen atmosphere there is added at room temperature 1.52 g. of lithium aluminum hydride (0.040 mole) and 100 ml. anhydrous tetrahydrofuran. Stirring is initiated and 8.7 g. of spiro[10,11-dihydro-5H-dibenzo[a,d]cycloheptene-4,1′-N-methyl isoindolin-3′-one] in 50 ml. of anhydrous tetrahydrofuran is added dropwise in ca. 30 minutes. The resulting mixture is then refluxed for 18 hours and cooled in an ice bath. Ethylacetate (9 ml) is added dropwise in ca. 10 minutes, followed by the dropwise addition of 3 ml. of 2 N sodium hydroxide in ca. 10 minutes and the dropwise addition of 4.5 ml. H₂O in ca. 10 minutes. The resulting mixture is dried over anhydrous magnesium sulfate, filtered, and evaporated in vacuo to give a colorless oil which provided crystals of spiro[10,11-dihydro-5H-dibenzo[a,d]cycloheptene-5,1'-N-methyl isoindoline] from ethyl acetate; m.p. 131°–133°C.

EXAMPLE 4

Spiro[10,11-dihydro-5H-dibenzo[a,d]cycloheptene-5,1'-N-methyl isoindoline] hydrochloride A solution of 5 g. of spiro[10,11-dihydro-5H-dibenzo[a,d]cycloheptene-5,1'-N-methyl isoindoline] in 100 ml. of ethanol is cooled to 5°C. and saturated with gaseous HCl. The solvent is removed and the residue treated with ether to give spiro[10,11-dihydro-5H-dibenzo[a,d]cycloheptene-5,1'-N-methyl isoindoline] hydrochloride as a white solid; m.p. 227.5° – 228.5°C.

EXAMPLE 5

Spiro[10,11-dihydro-5H-dibenzo[a,d]cycloheptene-5,1'-N-methyl isoindoline]

To a flask equipped with a stirrer, condenser and gas inlet tube maintained under a nitrogen atmosphere there is added at room temperature 1.52 g. of lithium aluminum hydride (0.040 mole) and 100 ml. anhydrous tetrahydrofuran. Stirring is initiated and 8 g. of 2-[10,11-dihydro-5-hydroxy-5H-dibenzo[a,d]cyclohepten-5-yl]-N-methyl benzamide in 50 ml. of anhydrous tetrahydrofuran is added dropwise in ca. 30 minutes. The resulting mixture is then refluxed for 18 hours and cooled in an ice bath. Ethylacetate (9 ml.) is added dropwise in ca. 10 minutes, followed by the dropwise addition of 3 ml. of 2 N sodium hydroxide in ca. 10 minutes and the dropwise addition of 4.5 ml. water in ca. 10 minutes. The resulting mixture is dried over anhydrous magnesium sulfate, filtered, and evaporated in vacuo to give amino alcohol intermediate.

To a flask equipped with a stirrer, condenser and gas inlet tube maintained under a nitrogen atmosphere there is added at room temperature 7 g. of the amino alcohol obtained above and 150 ml. of 2 M. sulfuric acid. Stirring is initiated and the mixture is heated at reflux for 18 hours. The reaction mixture is cooled on ice, made basic by controlled addition of solid potassium hydroxide and extracted with 2 × 150 ml. of methylene chloride. The methylene chloride is washed with water, dried over anhydrous magnesium sulfate and evaporated in vacuo. The resulting oil provides crystals of spiro[10,11-dihydro-5H-dibenzo[a,d]cycloheptene-5,1'-N-methyl isoindoline]; m.p. 131°–133°C. upon recrystallization from ethyl acetate.

EXAMPLES 6 AND 7

Sterile Suspension for Injection and Oral Liquid Suspension

The following pharmaceutical compositions are formulated with the indicated amount of active agent using conventional techniques. the injectable suspension and the oral liquid suspension represent formulations useful as unit doses and may be administered in the treatment of analgesia. The injectable suspension is suitable for administration once a day whereas the oral liquid suspension is suitably administered 2 to 4 times per day for this purpose.

| Ingredients | Weight (mg) sterile injectable suspension | Weight (mg) oral liquid suspension |
| --- | --- | --- |
| spiro[10,11-dihydro-5H-dibenzo[a,d]cycloheptene-5,1'-N-methyl isoindoline] hydrochloride | 10 | 25 |
| sodium carboxy methyl cellulose, U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, U.S.P. | — | 4.5 |
| propyl paraben, U.S.P. | — | 1.0 |
| polysorbate 80 (e.g. Tween 80), U.S.P. | — | 5 |
| sorbitol solution, 70%, U.S.P. | — | 2,500 |
| buffer agent to adjust pH for desired stability | q.s. | q.s. |
| water | q.s. for injection, q.s. to 1 ml. | q.s. to 5 ml. |

EXAMPLES 8 AND 9

Tablets and Capsules Suitable for Oral Administration

Tablets and capsules containing the ingredients indicated below may be prepared by conventional techniques and are useful in treating analgesia at a dose of one tablet or capsule 2 to 4 times a day.

| Ingredient | Weight (mg) tablet | Weight (mg) capsule |
| --- | --- | --- |
| spiro[10,11-dihydro-5H-dibenzo[a,d]cyclo-heptene-5,1'-N-methyl isoindoline] | 25 | 25 |
| tragacanth | 10 | — |
| lactose | 222.5 | 275 |
| corn starch | 25 | — |
| talcum | 15 | — |
| magnesium stearate | 2.5 | — |
| Total | 300 mg. | 300 mg. |

What is claimed is:

1. Spiro[10,11-dihydro-5H-dibenzo[a,d]cycloheptene-5,1'-N-methyl isoindoline].

2. A pharmaceutically acceptable acid addition salt of the compound of claim 1.

* * * * *